(12) United States Patent
Miyake et al.

(10) Patent No.: US 6,692,870 B2
(45) Date of Patent: Feb. 17, 2004

(54) ELECTRODE ACTIVE MATERIAL AND LITHIUM SECONDARY BATTERY

(75) Inventors: Masahide Miyake, Hirakata (JP); Masahisa Fujimoto, Osaka (JP); Shin Fujitani, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 294 days.

(21) Appl. No.: 09/840,308

(22) Filed: Apr. 24, 2001

(65) Prior Publication Data

US 2002/0009639 A1 Jan. 24, 2002

(30) Foreign Application Priority Data

Apr. 25, 2000 (JP) ......................... 2000-124178

(51) Int. Cl.⁷ ................................. H01M 4/58
(52) U.S. Cl. ............... 429/218.1; 429/232; 429/231.95; 429/213; 429/212
(58) Field of Search ............. 429/218.1, 232, 429/231.95, 212, 213

(56) References Cited

U.S. PATENT DOCUMENTS

| | | | |
|---|---|---|---|
| 3,532,543 A | 10/1970 | Nole et al. ............ | 136/6 |
| 3,716,409 A | 2/1973 | Cairns et al. .......... | 136/6 |
| 3,811,947 A | 5/1974 | Metcalfe, III et al. ... | 136/6 |
| 3,884,715 A | 5/1975 | Gay et al. ............ | 136/6 |
| 3,907,591 A | 9/1975 | Lauck ................. | 136/6 |
| 3,915,743 A | 10/1975 | Lauck ................. | 136/6 |
| 5,506,072 A | 4/1996 | Griffin et al. ......... | 429/188 |
| 5,523,179 A * | 6/1996 | Chu ................... | 429/104 |
| 5,532,077 A | 7/1996 | Chu ................... | 429/102 |
| 5,582,623 A | 12/1996 | Chu ................... | 29/623.1 |
| 5,686,201 A | 11/1997 | Chu ................... | 429/52 |
| 5,789,108 A | 8/1998 | Chu ................... | 429/213 |
| 5,814,420 A | 9/1998 | Chu ................... | 429/104 |
| 6,017,651 A | 1/2000 | Nimon et al. .......... | 429/101 |
| 6,200,704 B1 | 3/2001 | Katz et al. ........... | 429/218.1 |
| 6,406,814 B1 * | 6/2002 | Gorkovenko et al. .... | 429/213 |

FOREIGN PATENT DOCUMENTS

| | | | |
|---|---|---|---|
| JP | 06-275313 A | 9/1994 | |
| JP | 06-275313 * | 9/1994 | .......... H01M/10/36 |
| JP | 09-147868 * | 6/1997 | .......... H01M/4/60 |
| JP | 11-214008 A | 8/1999 | |
| JP | 2000-311684 A | 11/2000 | |
| JP | 2000-340225 A | 12/2000 | |

OTHER PUBLICATIONS

J. Coetzer; "High Temperature Lithium/Sulphur Batteries: A Preliminary Investigation of A Zeolite–Sulphur Cathode"; *Electrochimica Acta.*, 1978, vol. 23, pp. 787–789.

* cited by examiner

Primary Examiner—Patrick Ryan
Assistant Examiner—Angela J Martin
(74) Attorney, Agent, or Firm—Kubovcik & Kubovcik

(57) ABSTRACT

The present invention provides an improved electrode material for a lithium secondary battery to provide a lithium secondary battery that is light in weight and has high energy density. Sulfur and a catalyst material such as active carbon, and the like, that reduces activation energy of an addition reaction of lithium to sulfur and allows the reaction to occur at not greater than 60° C., are included in the electrode material.

15 Claims, 7 Drawing Sheets

ELECTRODE ACTIVE MATERIAL AND LITHIUM SECONDARY BATTERY

FIELD OF THE INVENTION

The present invention relates to an electrode active material for a secondary lithium battery and a secondary lithium battery having a positive or negative electrode prepared from the electrode active material. Specifically, the present invention is characterized in that is it possible to provide a lithium secondary battery having a light weight and high energy density.

BACKGROUND OF THE INVENTION

A lithium secondary battery that utilizes oxidation and reduction of lithium has been used as a new type of battery having high capacity and high energy density.

As a positive electrode material for a positive electrode of a lithium secondary battery, an oxide of a transition metal, for example, manganese, cobalt, nickel, iron, vanadium and niobium and the like, and a lithium transition metal oxide where lithium is included in the transition metal oxide, have been used.

However, when the above described material is used for the positive electrode of a lithium secondary battery, the battery is heavy and is increased in cost. It is also a problem that capacity per weight is not always sufficient, and a lithium secondary battery that is light in weight and has high energy density cannot be obtained.

It has been tried to use sulfur as an electrode material of a secondary battery in the past. Sulfur requires high temperature for a charge discharge reaction. Therefore, it is difficult to use it for a general secondary battery.

The use of an organic sulfide compound, for example, 2,5-dimercapto-1,3,4-thiadiazole (DMcT) or the like as a positive electrode material has recently been studied.

However, there is a problem that the organic sulfide compound includes many elements, for example, C, H, and the like, that do not participate in a charge discharge reaction, and capacity per unit weight is reduced compared to sulfur alone.

OBJECT OF THE INVENTION

An object of the present invention is to solve the problems explained above. That is, an electrode material for a lithium secondary battery is improved so as to obtain a lithium secondary battery that is light in weight and has high energy density.

SUMMARY OF THE INVENTION

The present invention provides an electrode material that includes sulfur and a catalyst material that reduces activation energy of an addition reaction when lithium reacts with sulfur at a temperature not greater than 60° C. to solve problems described above.

Figure 1:
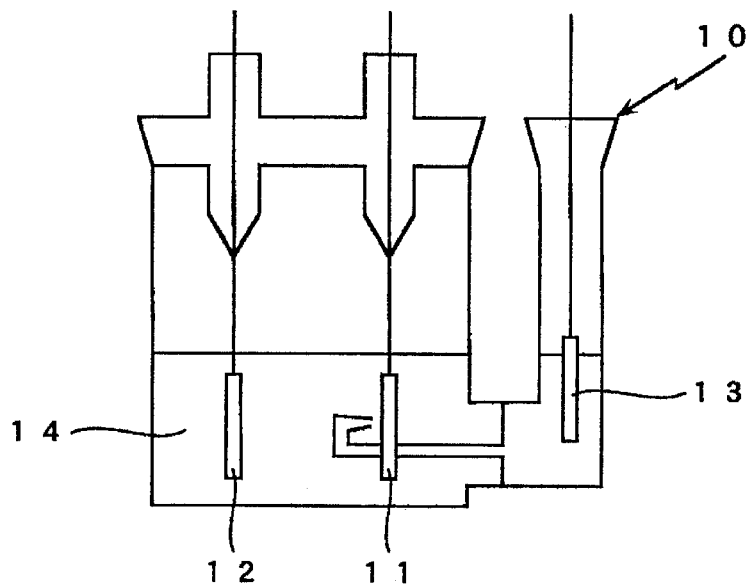
FIG. 1 is an outline of a test cell that was used to evaluate characteristics of batteries prepared in Examples of the present invention and in Comparative Examples.

[Explanation of elements}
10: test cell
11: working electrode
12: counter electrode
13: reference electrode
14: non-aqueous electrolyte

DETAILED EXPLANATION OF THE INVENTION

When a catalyst material is added to sulfur as an electrode material of the present invention, charge-discharge reaction occurs at a low temperature.

When the electrode material is used for a positive or negative electrode of a lithium secondary battery, capacity per weight of an electrode increases and a lithium secondary battery that is light in weight and has high energy density can be provided.

Active carbon is preferable for the catalyst material as described above having low crystallizability, very large specific surface area and great ability to absorb material and great catalytic effect. Active carbon having a large specific surface area of 1000–4500 $m^2/g$ is preferable.

Using active carbon as the catalyst material makes it possible to reduce active energy of an addition reaction when lithium reacts with sulfur and for the charge discharge reaction to occur at room temperature around 25° C. Platinum metals, for example, platinum, palladium, and the like, can be used as well as active carbon. However, they cost more. It is also possible for carbon to support the above-described platinum metals.

If the amount of sulfur that is to be involved in the charge discharge reaction is too little in an electrode material including sulfur and the catalyst material described above, sufficient capacity cannot be obtained. On the other hand, if the amount of sulfur is too much, the amount of catalyst material will be reduced. This makes it difficult for a charge discharge reaction at low temperature to have sufficient capacity. Therefore, the amount of sulfur in the electrode material is adjusted in a range of 5–50 wt %, preferably 5–20 wt %, and further preferably, 5–10 wt %.

When an electrode is prepared using the sulfur and catalyst material, there are the following methods. For example, a powder catalyst material and sulfur are mixed to form a desired shape, or after a solution in which sulfur is dissolved penetrates into the catalyst material, the solvent is evaporated to make a complex of sulfur and the catalyst material which is formed into a desired shape, or a solution in which sulfur is dissolved penetrates into a fiber material included as the catalyst material and then the solvent is evaporated. A solvent for dissolving sulfur is not limited. Carbon disulfide can be used, but N-methyl-2-pyrrolidone is preferable.

The prepared electrode is used for a positive or negative electrode of a lithium secondary battery.

When the electrode material is used for the positive electrode of a lithium secondary battery, generally used known materials can be used for a negative electrode material of the negative electrode, for example, lithium metal and lithium alloy, for example, Li—Al, Li—In, Li—Sn, Li—Pb, Li—Bi, Li—Ga, Li—Sr, Li—Si, Li—Zn, Li—Cd, Li—Ca, Li—Ba, and the like, and carbon material, for example, graphite, coke, calcined organic material, and the like, that can occlude or release lithium ion.

When the electrode material is used for the negative electrode of a lithium secondary battery, generally used known materials can be used for a positive electrode material of the positive electrode, for example, a transition metal oxide including manganese, cobalt, nickel, iron, vanadium, niobium, and the like. Furthermore, lithium-transition metal complex oxides, which are materials as described above including lithium, can be used.

When the electrode material is used for the positive electrode, it is lighter and has a larger capacity per unit weight than a conventional positive electrode material.

As a solute in a nonaqueous solvent for a lithium secondary battery which includes the electrode described above as a positive or negative electrode, a generally used solute can be used. Nonaqueous electrolyte in which a solute is dissolved in an organic solvent, polymer electrolyte in which a solute is included in a polymer, gel polymer electrolyte in which the nonaqueous electrolyte is included in polymer, and the like, can be used.

As the organic solvent described above, ethylene carbonate, propylene carbonate, vinylene carbonate, cyclopentanone, sulfolan, dimethylsulfolan, 3-methyl-3-oxazolidine-2-one, γ-butyrolactone, dimethyl carbonate, diethyl carbonate, ethyl methyl carbonate, methyl propyl carbonate, buthyl methyl carbonate, ethyl propyl carbonate, butyl ethyl carbonate, dipropyl carbonate, 1,2-dimethoxyethane, tetrahydrofuran, 2-methyl tetrahydrofuran, 1,3-dioxolane, methyl acetate, ethyl acetate, can be used alone or in a combination of more than two.

As a solute described above there can be mentioned lithium compounds, for example, $LiPF_6$, $LiBF_4$, $LiSiF_6$, $LiCF_3SO_3$, $LiAsF_6$, $LiN(CF_3SO_2)_2$, $LiCF_3(CF_2)_3SO_3$, and the like.

As a polymer described above, there can be mentioned for example, polyethylene oxide, polypropylene oxide, polyethylene glycol diacrylate, and the like.

DESCRIPTION OF PREFERRED EMBODIMENTS

An electrode material of the present invention is described below in detail in conjunction with certain examples as well as comparative examples to show that a lithium secondary battery 20 having the electrode material in the examples can obtain sufficient battery capacity. An electrode material of the present invention is not limited to the materials disclosed in the following examples, and can be modified within the scope and spirit of the appended claims.

EXAMPLE 1

In Example 1, active carbon having an average particle size of 16.1 μm, specific surface area of 1056 $m^2/g$ and minimum porous diameter of 1.5 nm (Kansai Thermochemistry, Inc.: AC-10) was used as a catalyst material.

The active carbon in an amount of 5 g and 1.67 cc of a solution of 0.6 g of polytetrafluoroethylene (PTFE) dispersed in 1 cc of water were mixed and ground for 30 minutes in a mortar to a solid, and was dried in a dryer at 60° C. overnight to evaporate water. The dried material was crushed by a grinder for 5 minutes to make a powder. The powder was dried in a vacuum at 110° C. for two hours to completely evaporate the water.

Then the powder was again crushed by the grinder for 5 minutes. After obtained powder of 0.2 g and sulfur of 0.2 g were mixed in a mortar for 30 minutes, the mixture was placed in a mold, and was pressed for five seconds at 150 $kg/cm^2$ to form a disk having a diameter of 10.3 mm. The disk was wrapped by a stainless steel mesh to prepare an electrode in Example 1 which was a mixture of sulfur and active carbon.

A ratio by weight of sulfur, active carbon and PTFE was 47.5:47.5:5.

EXAMPLE 2

In Example 2, the same active carbon as in Example 1 (Kansai Thermochemistry, Inc.: AC-10) was used as a catalyst material.

Sulfur in an amount of 0.006 g was dissolved in 1 cc of a solution of N-methyl-2-pyrrolidone (NMP) containing 0.01 g/cc of polyvinylidene fluoride (PVdF), 0.006 g of the active carbon was added thereto, and the mixture was stirred by a mixer for one hour to obtain a semisolid material to prepare an electrode.

The semisolid material was transferred to a glass container, dried at 60° C. for two hours to evaporate NMP which was the solvent. The dried material was placed in a mold, and pressed at 150 $kg/cm^2$ to form a disk having a diameter of 10.3 mm. The disk was wrapped by a stainless steel mesh to prepare an electrode in Example 2 which was a complex of sulfur and active carbon.

A ratio by weight of sulfur, active carbon and PVdF was 47.5:47.5:5.

EXAMPLE 3

In Example 3, active carbon fiber cloth having a specific surface area of 2500 $m^2/g$ and minimum porous diameter of 2.0 nm (Kuraray, Inc.: Kuractive 2500) was used as a catalyst material.

Sulfur in an amount of 0.006 g was dissolved in 1 cc of NMP, the active carbon fiber cloth was dipped in the solution for one hour to allow the solution to penetrate into the active carbon fiber cloth. The active carbon fiber cloth was dried in a vacuum at 60° C. for two hours to evaporate NMP to prepare an electrode in Example 3 which was an active carbon fiber cloth including sulfur.

A ratio by weight of sulfur and active carbon was 3:8.

COMPARATIVE EXAMPLE 1

In comparative Example 1, acetylene black having an average particle size of 17 μm, specific surface area of 31.7 $m^2/g$ and minimum porous diameter of 6.6 nm (Denki Kagaku Kogyo: Denkablack) was used as a catalyst material.

An electrode in Comparative Example 1 was prepared in the same manner as Example 2 except that acetylene black was used as the catalyst material.

COMPARATIVE EXAMPLE 2

In comparative example 2, the same active carbon (Kansai Thermochemistry, Inc.: AC-10) as used in Example 1, except that the active carbon was calcined at 2800° C. to graphitize, was used as a catalyst material. The carbon material had an average particle size of 48.1 μm, specific surface area of 29 m²/g and minimum porous diameter of 4.6 nm.

An electrode in Comparative Example 2 was prepared in the same manner as Example 1 except that the carbon material described above was used as a catalyst material.

Each electrode prepared in Examples 1 to 3 and Comparative Examples 1 and 2 was used as a working electrode 11 that was a positive electrode, lithium metal was used as a counter electrode 12, that is, a negative electrode, and a reference electrode 13. LiPF$_6$ was dissolved in a mixed solvent of ethylene carbonate and diethyl carbonate in a ratio of 1:1 by volume to a concentration of 1 mol/l to prepare a nonaqueous electrolyte in a test cell 10 as shown in FIG. 1. A capacity of the counter electrode 12 was designed to be more than 10 times as much as the capacity of the working electrode 11.

Discharge and charge characteristics of each test cell prepared as described above were evaluated at a temperature of 25 ° C. by discharging the cell to a final discharge voltage of 1 V at a discharge current of 0.5 mA, and charging the cell to a final charge voltage of 3.5 V at a charge current of 0.5 mA.

Figure 2:
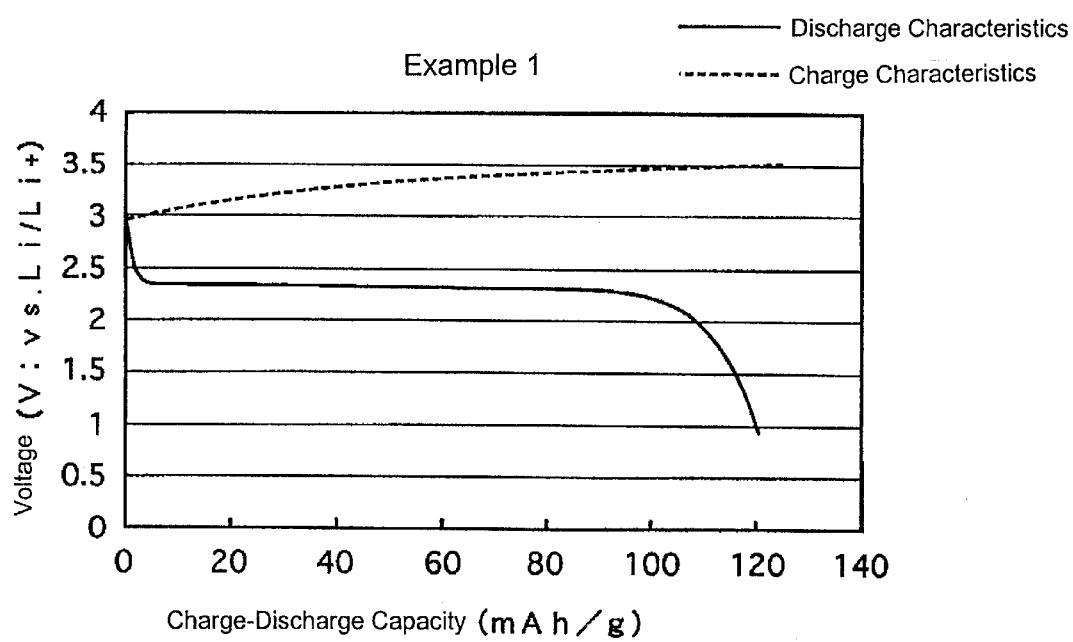
FIG. 2 is a graph showing initial charge-discharge characteristics of an electrode in Example 1.
Figure 3:
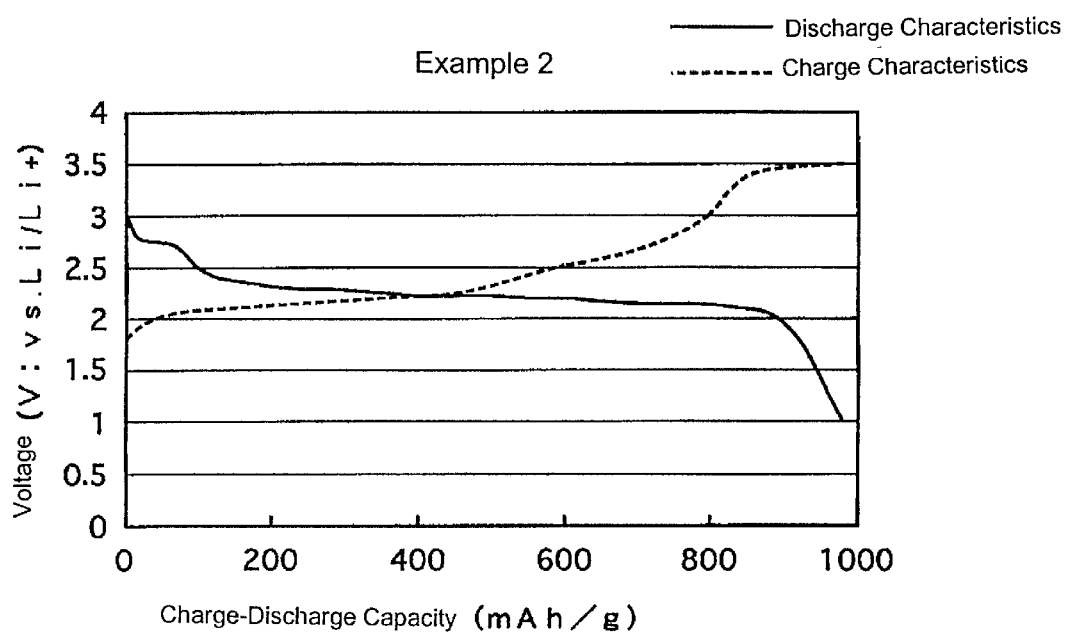
FIG. 3 is a graph showing initial charge-discharge characteristics of an electrode in Example 2.

Charge and discharge characteristics of the electrode in Example 1 are shown in FIG. 2. Charge and discharge characteristics of the electrode in Example 2 are shown in FIG. 3.

Figure 4:
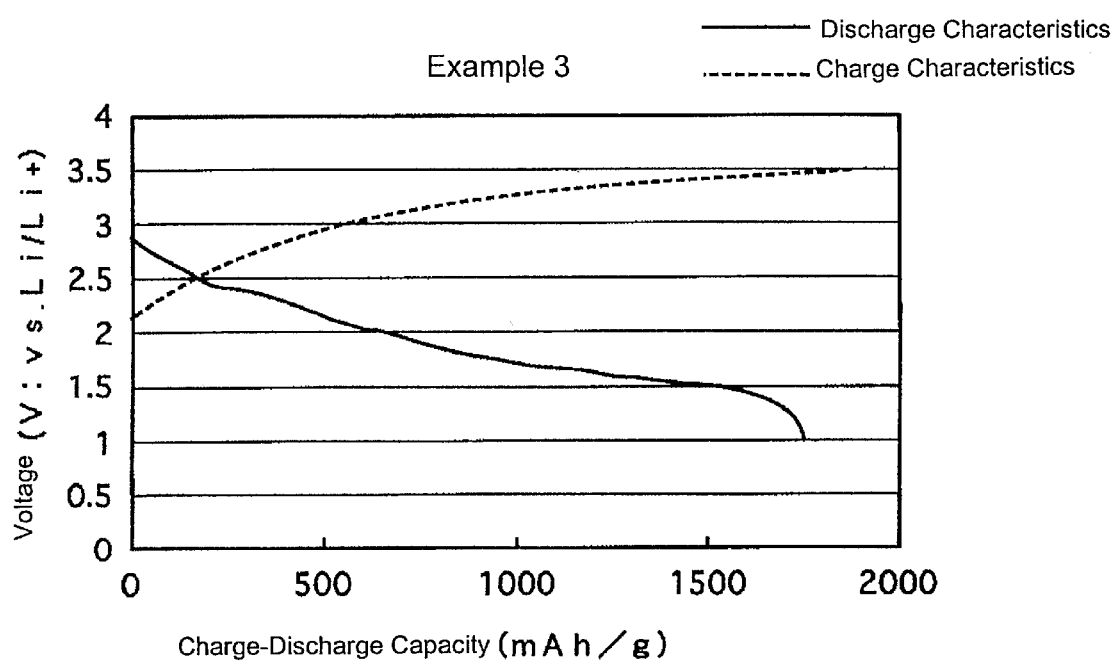
FIG. 4 is a graph showing initial charge-discharge characteristics of an electrode in Example 3.
Figure 5:
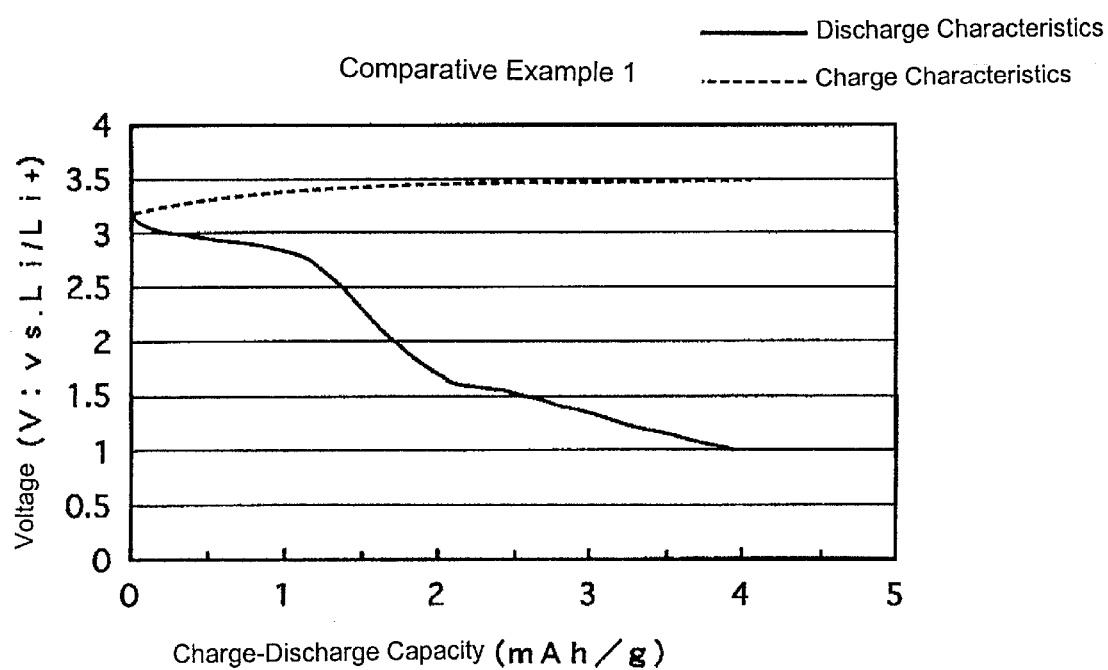
FIG. 5 is a graph showing initial charge-discharge characteristics of an electrode in Comparative Example 1.
Figure 6:
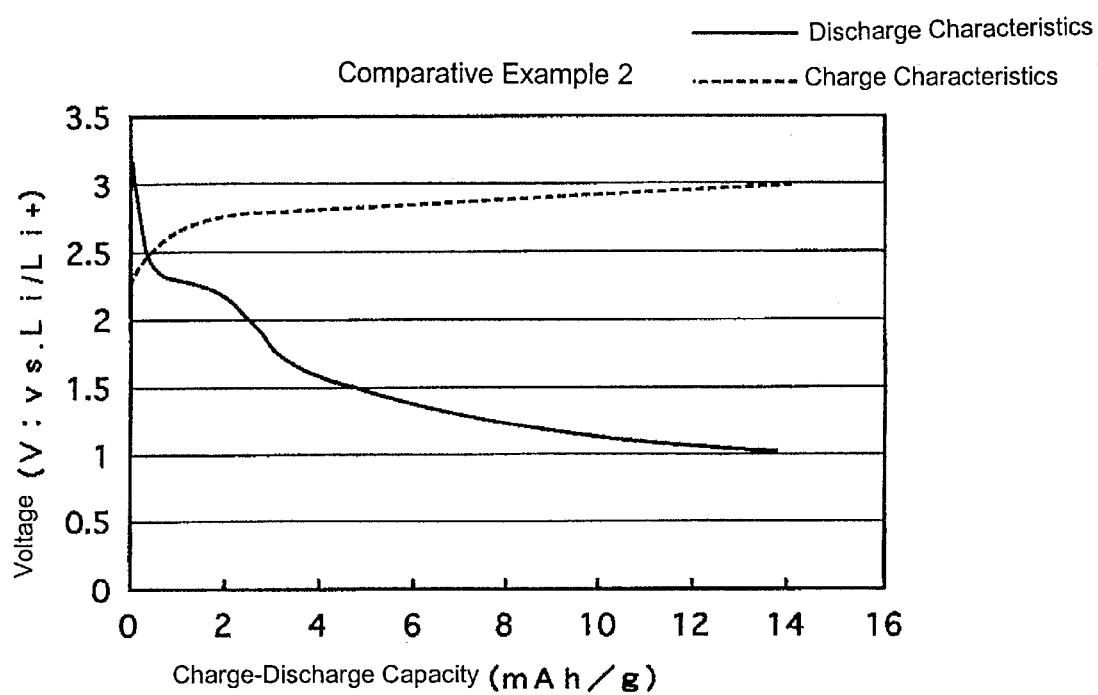
FIG. 6 is a graph showing initial charge-discharge characteristics of an electrode in Comparative Example 2.

Charge and discharge characteristics of the electrode in Example 3 are shown in FIG. 4. Charge and discharge characteristics of the electrode in Comparative Example 1 are shown in FIG. 5. Charge and discharge characteristics of the electrode in Comparative Example 2 are shown in FIG. 6. In FIGS. 2 to 6, the discharge characteristics are shown by a solid line, and the charge characteristics are shown by a chain line. Charge and discharge capacities per 1 g of sulfur are shown in the drawings.

The electrodes in Examples 1 to 3 that were prepared using an active carbon having a specific surface area of greater than 1000 m²/g as a catalyst material had a discharge capacity of greater than 100 mAh/g, and a flat discharge potential at about 2 V. However, the electrodes in Comparative Examples 1 and 2 that were prepared using an active carbon having a specific surface area of less than 1000 m²/g as a catalyst material could not have a sufficient charge and discharge reaction by sulfur, and discharge capacities were small.

When the electrodes in Examples 1 to 3 are compared, the electrode in Example 3 that was prepared using active carbon having a specific surface area of greater than 1500 m²/g as a catalyst material had greater discharge capacity. Although the electrodes in Examples 1 and 2 were prepared using the same active carbon, the electrode in Example 2 that was prepared from a complex of sulfur and active carbon had a greater discharge capacity than the electrode in Example 1 that was prepared from a mixture of sulfur and active carbon.

Figure 7:
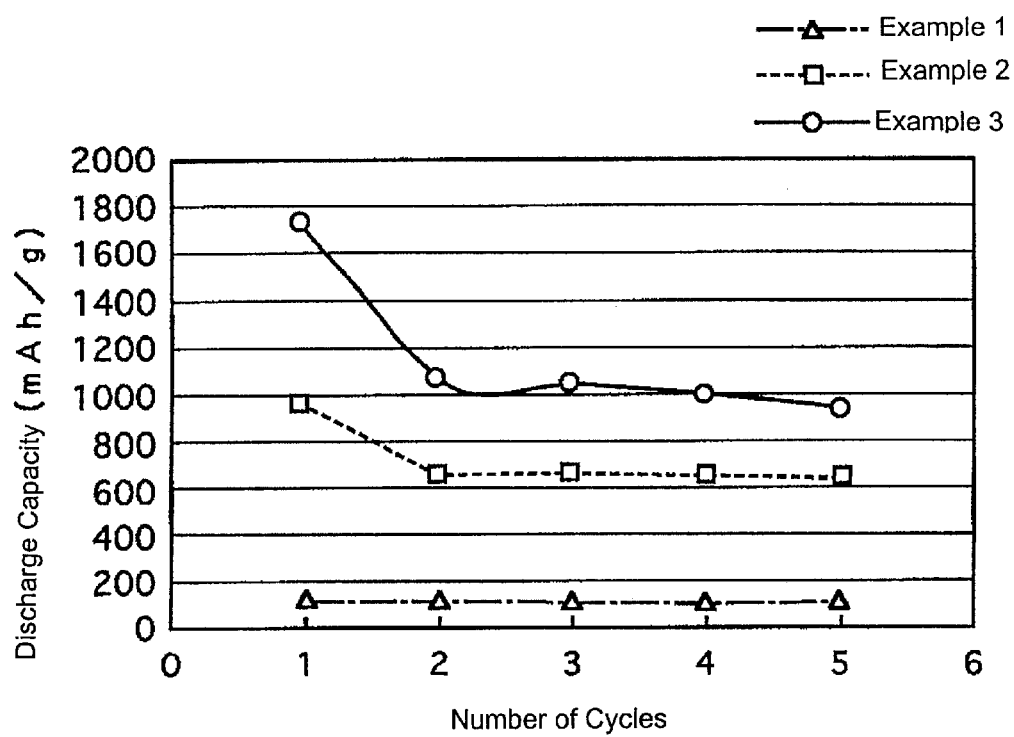
FIG. 7 is a graph showing charge-discharge cycle characteristics of each electrode in Examples 1–3.

Each electrode in Examples 1 to 3 was repeatedly subjected to a cycle of charging and discharging. A cycle consists of a step of discharging to a final discharge voltage of 1 V at a discharge current of 0.5 mA at a temperature of 25° C., and a step of charging to a final charge voltage of 3.5 V at a charge current of 0.5 mA at a temperature of 25° C. Discharge capacity at each cycle was obtained. The results are shown in FIG. 7. In FIG. 7, the results of the electrode in Example 1 are shown by a combination of Δ and an alternate long and short dash line, the results of the electrode in Example 2 are shown by a combination of and a chain line, and the results of the electrode in Example 3 are shown by a combination of ○ and a solid line.

The electrode in Example 1 had stable discharge capacity from the beginning. The electrodes in Examples 2 and 3 had a discharge capacity at the second cycle smaller than that at the initial cycle, but were stable after the second cycle.

When charge and discharge are repeated, it is believed that sulfur reacts with lithium to create an S—Li bond, and S—Li is dissolved in a nonaqueous solution to dramatically reduce discharge capacity. However, the discharge capacity of each electrode in Examples 1 to 3 was not reduced after repeated charge and discharge. Even though S—Li bond was created, it is believed that the active carbon could inhibit elution of sulfur by its absorption ability.

EXAMPLES 4.1–4.5

In Examples 4.1–4.5, active carbon having an average particle size of 7.4 μm, specific surface area of 2290 m²/g and minimum porous diameter of 1.9 nm (Kansai Thermochemistry, Inc.: AC-20) was used as a catalyst material.

An electrode was prepared in almost the same manner as described in Example 1. The active carbon and a solution of 0.6 g of polytetrafluoroethylene (PTFE) dispersed in 1 cc of water were mixed and ground for 30 minutes in a mortar to a solid, and was dried in a dryer at 60° C. overnight to evaporate the water. The dried material was crushed by a grinder for 5 minutes to make a powder. The powder was dried in a vacuum at 110° C. for two hours to completely evaporate the water.

Then the powder was crushed again by the grinder, and the after-obtained powder and sulfur were mixed in a mortar for 30 minutes, the mixture was placed in a mold, and was pressed at 150 kg/cm² for five seconds to form a disk having a diameter of 10.3 mm. The disk was wrapped by a stainless steel mesh to prepare electrodes in Examples 4.1 to 4.5 which were a mixture of sulfur and active carbon.

A ratio of sulfur and active carbon in Examples 4.1 to 4.5 varied. Ratios by weight of sulfur, active carbon and PTFE were 5:90:5 in Example 4.1, 10:85:5 in Example 4.2, 20:75:5 in Example 4.3, 30:65:5 in Example 4.4, and 50:45:5 in Example 4.5.

EXAMPLES 5.1–5.5

In Examples 5.1–5.5, the same active carbon as in Examples 4.1 to 4.5 (Kansai Thermochemistry, Inc.: AC-20) was used as a catalyst material.

An electrode was prepared in almost the same manner as described in Example 2. Sulfur was dissolved in 1 cc of an N-methyl-2-pyrrolidone (NMP) solution containing 0.01 g/cc of polyvinylidene fluoride (PVdF), the active carbon was added hereto, and the mixture was stirred by a mixer for one hour to obtain a semisolid material to prepare an electrode.

The semisolid material was transferred to a glass container, was dried at 60° C. for two hours to evaporate the NMP solvent. The dried material was placed in a mold, and pressed at 150 kg/cm² for five seconds to form a disk having a diameter of 10.3 mm. The disk was wrapped by a stainless steel mesh to prepare electrodes in Examples 5.1 to 5.5 which were a complex of sulfur and active carbon.

A ratio of sulfur and active carbon in Examples 5.1 to 5.5 varied. Ratios by weight of sulfur, active carbon and PVdF were 5:90:5 in Example 5.1, 10:85:5 in Example 5.2, 20:75:5 in Example 5.3, 30:65:5 in Example 5.4, and 50:45:5 in Example 5.5.

COMPARATIVE EXAMPLES 3.1–3.5

In Comparative Examples 3.1 to 3.5, the same active carbon (Kansai Thermochemistry, Inc.: AC-20) as used in Examples 4.1 to 4.5 except that the active carbon was graphitized by calcining at 2800° C., was used as a catalyst material. The carbon material had an average particle size of 7.2 $\mu$m, specific surface area of 8 $m^2/g$ and minimum porous diameter of 66 nm.

Electrodes in Comparative Examples 3.1 to 3.5 were prepared in the same manner as Examples 4.1 to 4.5 except that the carbon material described above was used as a catalyst material.

A ratio of sulfur and active carbon in Comparative Examples 3.1 to 3.5 varied. Ratios by weight of sulfur, active carbon and PTFE were 5:90:5 in Comparative Example 3.1, 10:85:5 in Comparative Example 3.2, 20:75:5 in comparative Example 3.3, 30:65:5 in Comparative Example 3.4, and 50:45:5 in Comparative Example 3.5.

COMPARATIVE EXAMPLES 4.1–4.5

In Comparative Examples 4.1 to 4.5 the same active carbon (Kansai Thermochemistry, Inc.: AC-20) as used in Examples 4.1 to 4.5 was used except that the active carbon calcined at 2800° C. to graphitize was used as a catalyst material as well as in

COMPARATIVE EXAMPLES 3.1 TO 3.5.

Electrodes in Comparative Examples 4.1 to 4.5 were prepared in the same manner as in Examples 5.1 to 5.5 except that the carbon material described above was used as a catalyst material.

A ratio of sulfur and active carbon in Comparative Examples 4.1 to 4.5 varied. Ratios by weight of sulfur, active carbon and PVdF were 5:90:5 in Comparative Example 4.1, 10:85:5 in Comparative Example 4.2, 20:75:5 in Comparative Example 4.3, 30:65:5 in comparative Example 4.4, and 50:45:5 in Comparative Example 4.5.

Each electrode prepared in Examples 4.1 to 4.5 and 5.1 to 5.5 and Comparative Examples 3.1 to 3.5 and 4.1 to 4.5 was used as an working electrode 11 that was a positive electrode of a test cell 10 in the same manner as the test cell of Examples 1 to 3 and Comparative Examples 1 and 2. Discharge capacity of each test cell prepared as described above was evaluated at a temperature of 25° C. by discharging the cell to a final discharge voltage of 1 V at a discharge current of 0.5 mA, and the results are shown in FIG. 8.

Figure 8:
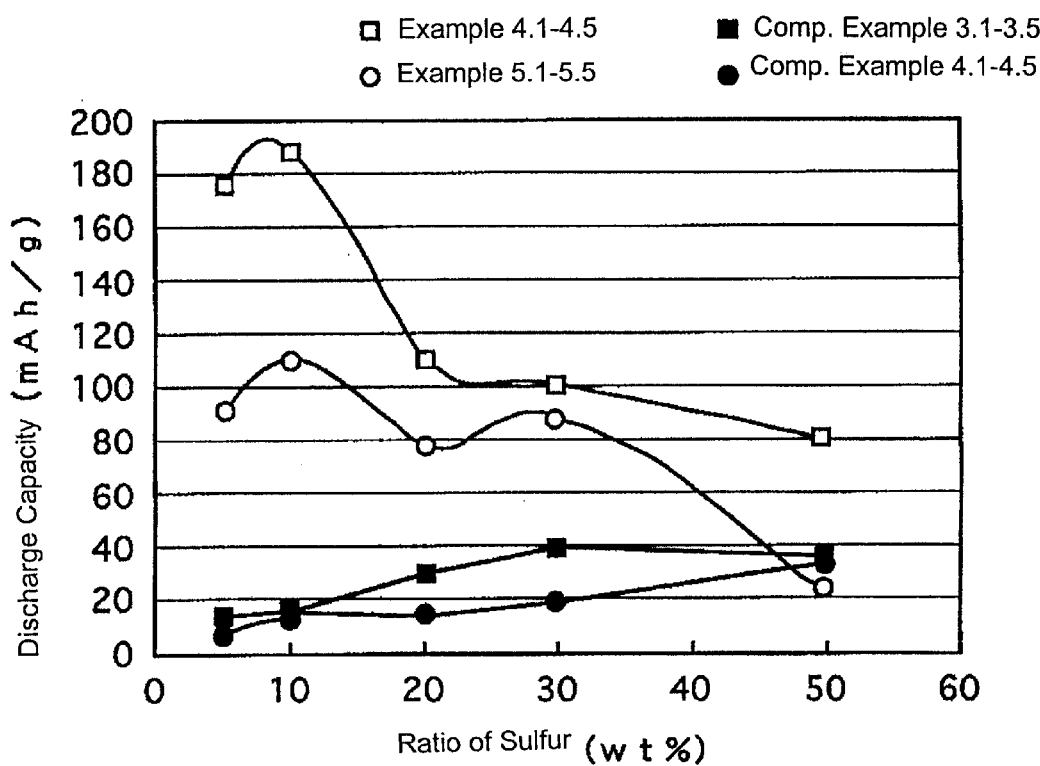
FIG. 8 is a graph showing initial discharge capacity of each electrode in Examples 4.1–4.5 and 5.1–5.5 and Comparative Examples 3.1 to 3.5 and 4.1 to 4.5.

In FIG. 8, discharge capacities of the electrodes in Examples 4.1 to 4.5 are shown by ○, discharge capacities of the electrodes in Examples 5.1 to 5.5 are shown by ⊙, discharge capacities of the electrodes in Comparative Examples 3.1 to 3.5 are shown by ■, and discharge capacity of the electrodes in Comparative Examples 4.1 to 4.5 are shown by ●. The discharge capacity in FIG. 8 is a discharge capacity per 1 g of an electrode material.

The electrodes in Examples 4.1 to 4.5 and Examples 5.1 to 5.5 that were prepared using an active carbon having a specific surface area of greater than 1000 $m^2/g$ as a catalyst material generally have larger discharge capacity than the electrodes in Comparative Examples 3.1 to 3.5 and Comparative Examples 4.1 to 4.5 that were prepared using an active carbon having a specific surface area of less than 1000 $m^2/g$. Especially, when concentration of sulfur in an electrode material was in a range of 5 to 10% by weight, discharge capacity was larger.

ADVANTAGES OF THE INVENTION

As explained above, an electrode material of the present invention includes a catalyst material and sulfur that provides an addition reaction of lithium with sulfur at not greater than 60° C. to reduce activation energy of the addition reaction of lithium with sulfur. Therefore, charge discharge reaction can occur at a low temperature. When the electrode material is used for a positive or negative electrode of a lithium secondary battery, capacity per unit weight of the electrode increases, and a lithium secondary battery that is light in weight and has a high energy density can be provided.

When an active carbon having a specific surface area of 1000 to 4500 $m^2/g$ is used as a catalyst material in the electrode material of the present invention, activation energy of addition reaction of lithium to sulfur is significantly reduced and charge discharge reaction can occur at room temperature of around 25° C. A lithium secondary battery, which has these electrode materials as a positive electrode or negative electrode, can restrain a decrease of a discharge capacity in the case of carrying out charge-discharge cycle repeatedly. It is found that a lithium secondary battery as described above has enough good charge-discharge cycle characteristics.

What is claimed is:

1. An electrode material comprising sulfur and a catalyst material that reduces an activation energy of addition reaction of lithium to sulfur and the addition reaction occurs at not greater than 60° C., wherein the catalyst material is active carbon powder.

2. An electrode material according to 1, wherein the catalyst material is active carbon powder having a specific surface area of 1000 to 4500 $m^2/g$.

3. An electrode material according to claim 1, wherein sulfur is contained in an amount of 5 to 50 wt %.

4. An electrode material according to claim 2, wherein sulfur is contained in an amount of 5 to 50 wt %.

5. An electrode material according to claim 1, wherein sulfur is contained in an amount of 5 to 20 wt %.

6. An electrode material comprising sulfur and a catalyst material that reduces an activation energy of addition reaction of lithium to sulfur and the addition reaction occurs at not greater than 60° C., wherein the catalyst material is active carbon having a specific surface area of 1000 to 4500 $m^2/g$ and sulfur is contained in an amount of 5 to 20 wt %.

7. An electrode material according to claim 1, wherein sulfur is contained in an amount of 5 to 10 wt %.

8. An electrode material according to claim 2, wherein sulfur is contained in an amount of 5 to 10 wt %.

9. An electrode material according to claim 1, wherein a solution including sulfur is penetrated into the catalyst material, and a solvent of the solution is removed to provide a complex of sulfur and the catalyst material.

10. A lithium secondary battery comprising an electrode material according to claim 1, used for a positive or negative electrode.

11. A lithium secondary battery comprising an electrode material according to claim 2, used for a positive or negative electrode.

12. A lithium secondary battery comprising an electrode material according to claim 9, used for a positive or negative electrode.

13. An electrode material according to claim 6, wherein sulfur is contained in an amount of 5 to 10 wt %.

14. An electrode material according to claim 6, wherein a solution including sulfur is penetrated into the catalyst material, and a solvent of the solution is removed to provide a complex of sulfur and the catalyst material.

15. A lithium secondary battery comprising an electrode material according to claim 9, used for a positive or negative electrode.

* * * * *